United States Patent [19]

Upper

[11] Patent Number: 5,201,528
[45] Date of Patent: Apr. 13, 1993

[54] UNITIZED SHAFT SEAL

[75] Inventor: Gerd Upper, Hoisdorf/Hamburg, Fed. Rep. of Germany

[73] Assignee: Dichtungstechnik G. Bruss GmbH & Co. KG, Hoisdorf/Hamburg, Fed. Rep. of Germany

[21] Appl. No.: 859,214

[22] Filed: Mar. 27, 1992

[30] Foreign Application Priority Data

Mar. 27, 1991 [DE] Fed. Rep. of Germany ........ 4110154

[51] Int. Cl.$^5$ .............................................. F16J 15/32
[52] U.S. Cl. .......................................... 277/35; 277/37; 277/133; 277/153
[58] Field of Search .................. 277/35, 37, 38, 39, 277/95, 96.1, 152, 153, 133, 135

[56] References Cited

U.S. PATENT DOCUMENTS

| | | | |
|---|---|---|---|
| 3,685,841 | 8/1972 | Keller | 277/47 |
| 4,037,849 | 7/1977 | Thumm | 277/37 |
| 4,123,068 | 10/1978 | Van Gorder | 277/152 |
| 4,208,057 | 6/1980 | Messenger | 277/37 |
| 4,836,561 | 6/1989 | Lebeck et al. | 277/96.1 |
| 5,004,248 | 4/1991 | Messenger et al. | 277/153 |
| 5,024,364 | 6/1991 | Nash | 277/152 |

FOREIGN PATENT DOCUMENTS 1942659 3/1970 Fed. Rep. of Germany.

OTHER PUBLICATIONS

Publication "Elasto-hydrodynamic Lubrication" Dowson et al. 1966.

Primary Examiner—William A. Cuchlinski, Jr.
Assistant Examiner—D. DePumpo
Attorney, Agent, or Firm—Lawrence J. Shurupoff

[57] ABSTRACT

A shaft seal in which a sealing lip provided on an elastomeric portion of a first annular member is in sealing contact with a sealing surface of a second annular member which in operation is adapted to rotate relative to the first annular member, and in which an annular elastomeric support portion provided on the first annular member supports axial forces on a radial surface of the second annular portion. The support portion includes protrusions with apices which cooperate with the radial surface of the second annular member and are distributed circumferentially at uniform intervals.

10 Claims, 2 Drawing Sheets

UNITIZED SHAFT SEAL

BACKGROUND OF THE INVENTION

1. Field of the Invention

The invention is directed in general to a shaft seal which includes a sealing lip provided on an elastomeric portion of a first annular member which is in rotating sealing contact with a sealing face of a second annular member. The invention is particularly directed to an annular elastomeric support portion provided on the first annular member for supporting axial loads on a radial surface of the second annular member via protrusions integrally formed on the support portion.

2. Description of Prior Developments

Unitized shaft seals are well known in the art, as disclosed in U.S. Pat. No. 3,685,841 and German Patent DE-OS 1,942,659. Such seals are sometimes called "cassette" seals or "unitized" seals because they include a counter-race necessary for sealing engagement with a sealing lip provided on a separate support or case and can readily be assembled and installed as an integral structural element.

A problem arises during installation of a unitized seal insofar as considerable axial installation loads are applied to the annular seal members as the seal is press-fit into a bore formed in a first structural member. These loads are applied to the second annular member via the first rigid annular member and its elastomeric support portion when the second annular member is fitted onto a second member, such as a shaft, which is rotatable relative to the first member. In practical use, the axial loads may, for instance, be in the range of 3t to 5t.

In their installed state, the two relatively rotatable parts of the unitized cassette seal remain axially fixed and abutted against one another. In use, as the second annular member rotates in operation relative to the first annular member under the influence of the axial installation load, high friction and considerable wear are caused as long as the axial abutment and loading between the two seal members exists. This can possibly result in premature failure of the shaft seal.

SUMMARY OF THE INVENTION

It is an object of the present invention to provide a unitized shaft seal having an operating life which is virtually unaffected by the above-mentioned axial load input created during installation and which avoids the high wear caused by such loading.

The present invention solves the axial loading and wear problems with a unitized shaft seal in which a sealing lip provided on an elastomeric portion of a first annular member is in sealing contact with a sealing face of a second annular member which in operation rotates relative to the first annular member. An annular elastomeric support portion provided on the first annular member supports axial loads on a radial face of the second annular member through a plurality of projections or apices formed on an undulating surface of the support portion.

The apices may be circumferentially distributed at uniform intervals. The undulating surface may rise at a slight inclination towards the apices in the direction of rotation such that an elasto-hydrodynamic film of lubricant is formed in the contacting zone between the radial surface on one seal member and the undulating surface on the other seal member.

Preferably, the undulating surface, as viewed circumferentially, is of a sinusoidal configuration although it may also have apices of circular arc shape or triangular shape. By forming the undulating surface with a symmetric configuration, an elasto-hydrodynamic film of lubricant may be formed in both directions of rotational movement. This bi-directional elasto-hydrodynamic lubricant film is important, for instance, when the invention is employed for bi-directional axle sealing where the axle rotates in both directions.

Due to the high axial forces applied to the elastomeric support portion of the unitized seal during its installation, the apex areas of the undulating surface of the elastomeric support portion are virtually flattened. Rectangular contact zones are thus formed at the apex areas in circumferential direction on account of the high axial pressure. The highest contact pressure prevails in the apex areas.

A lubricant, such as a lubricating grease, is typically provided in the region adjacent the elastomeric support portion. A continuous film of this lubricant may form between the elastically or plastically deformed contact points between the apex areas of the undulating surface and the radial surface. This film forms due to the elastohydrodynamic effects of the design in accordance with the invention. The lubricant film reduces or prevents the wear of the elastomeric support portion of the seal and thereby increases its operating life.

The amplitude and the period of the apices determine the inclination of the undulating surface in the direction of rotation towards the apices. This inclination is necessary for the formation of a continuous film of lubricant.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

FIG. 2 shows the state of a shaft seal according to the invention mounted on an axle or shaft, wherein axial forces caused by mounting are applied between the annular members of the shaft seal;

FIGS. 5, 6 and 7 are developments in circumferential direction of differently configured support portions of the outer annular member of a shaft seal according to the invention in which FIG. 5 illustrates the embodiment shown in FIG. 3.

In the various figures of the drawing, like reference characters designate like parts.

DETAILED DESCRIPTION OF THE PREFERRED EMBODIMENTS

Figure 1:
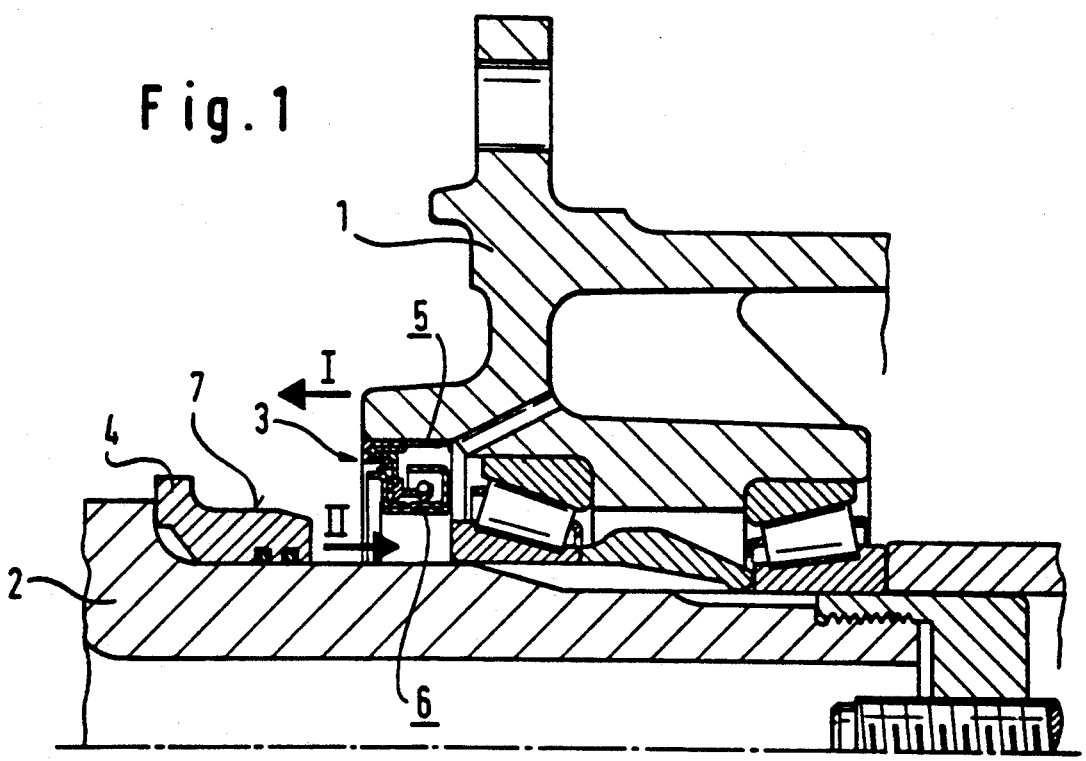
FIGS. 1 and 2 illustrate a shaft seal according to the invention, as used in a wheel bearing, in which the installation of the shaft seal in FIG. 1 is not quite complete.
Figure 2:
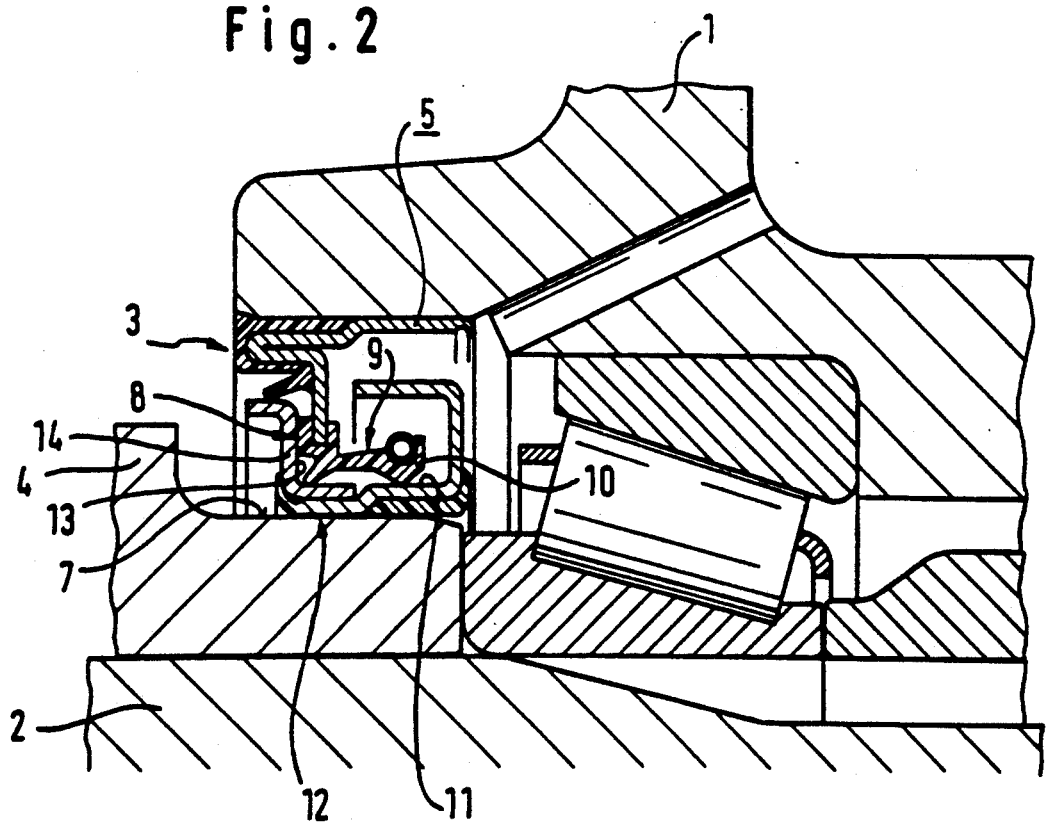

The invention will now be described in conjunction with FIGS. 1 and 2 which show a rotary wheel hub 1 mounted to an axle 2. A unitized shaft seal 3 is mounted to the hub and a support ring 4 is mounted on the axle. An outer annular casing member 5 of the shaft seal is axially-pressed into an annular recess provided in the hub 1. When mounting the wheel hub 1 on the support ring 4, the wheel hub is displaced in the direction of arrow I while carrying the shaft seal 3 along with it.

As soon as an inner annular casing member 6 of the shaft seal 3 engages the circumferential surface 7 of the support ring 4, the seal 3 will experience an axial resistance force. This resistance force is accommodated within the seal by an annular elastomeric support portion 8 which is integrally formed with an elastomeric portion 9 firmly connected to the outer annular member 5. Elastomeric portion 9 is formed with a sealing lip 10.

The sealing lip 10 cooperates with an axial sealing face 11 on an inner annular case member 12 which is sometimes referred to as a wear sleeve. The support portion 8 cooperates with a radial face 13 formed on an upright collar 14 extending from the inner annular member 12. Due to the relative rotation between the outer annular member 5 and the inner annular member 12 during use, undesirable wear will occur if the support portion 8 is formed as an annular surface which is in full uniform contact with the radial face 13 over its entire circumference.

Figure 3:
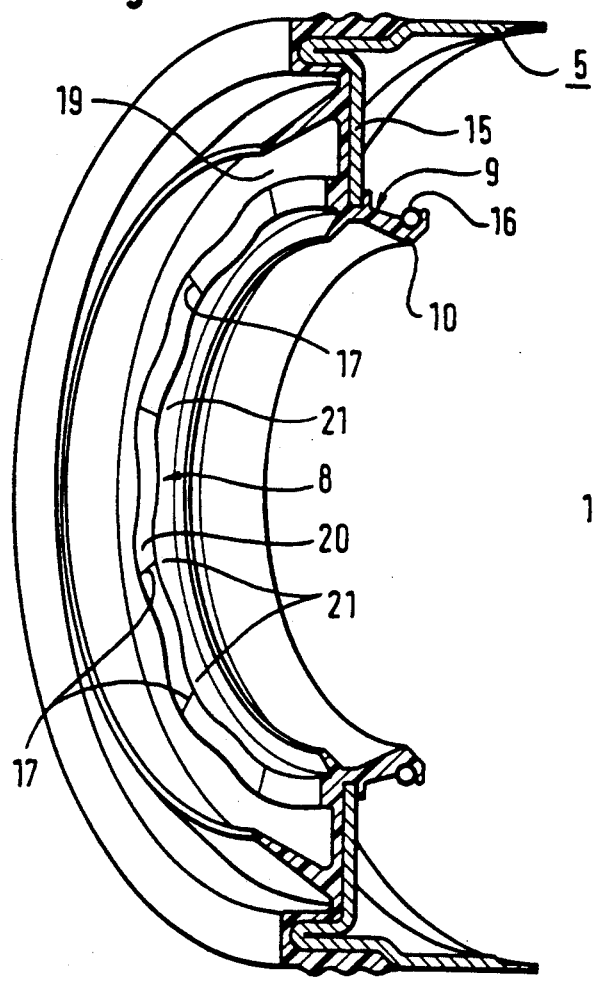
FIG. 3 is a perspective partial view of the outer annular member of a shaft seal according to the invention.
Figure 4:
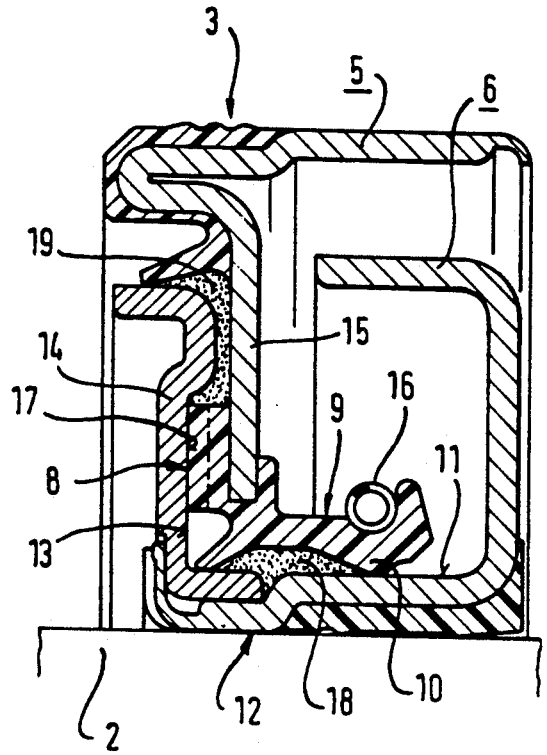
FIG. 4 is a sectional view of a shaft seal with an outer annular member according to FIG. 3.
Figure 5:
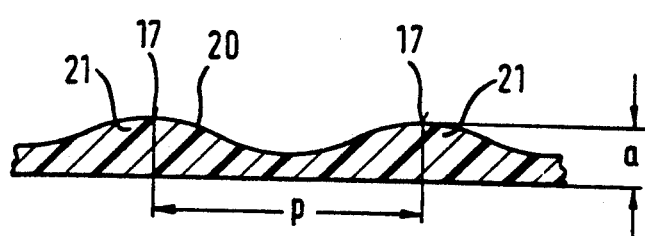

With reference to FIGS. 3, 4 and 5, an embodiment of the shaft seal 12 according to the invention, in particular of the support portion 8, will be explained in detail.

The perspective view of FIG. 3 shows a cut-away half view of the outer annular member 5. The outer annular member 5 includes an inwardly projecting radial flange 15 to which is vulcanized the elastomeric portion 9 including the support portion 8 and the sealing lip 10. In the assembled or installed state of FIG. 4, the sealing lip 10 is urged radially inwardly via garter spring 16 against the face 11 formed on the inner annular member 12.

As viewed in a circumferential or radial direction, the support portion 8 has a sinusoidally undulating contour 20 which defines apices 17 at the uppermost points of protrusions 21. Apices 17 are indicated as radial lines in FIG. 3. The support portion 8 in the assembled or installed state of the shaft seal is in line contact at several contact sites at apices 17 with the radial surface 13 of collar 14 of the inner annular member 12.

The seal 3 is filled with grease in the spaces 18 and 19 for lubrication of the sealing sites 10 and 17. The contacting portions of support portion 8 are deformed under the action of the high axial forces to provide a planar contacting zone at which an elasto-hydrodynamic film of lubricant will be formed at the sites of contact 17 due to the radial inward movement of the grease introduced into the space 19 radially outwardly of the support portion 8. Due to this film of lubricant, a large area of direct material contact caused by accommodation of the axial mounting force between the surface 20 of the support portion 8 and the radial surface 13 on the collar 14 of the annular member 12 is prevented, thus resulting in a considerably increased operating life.

FIG. 5 is a planar development of the sinusoidally undulating surface 20 of the support portion 8. The shape of FIG. 5 may be modified, for instance, by providing the protrusions 21 with a circular-arc shape as shown in FIG. 6 or making the protrusions 21 roof shaped or triangular shaped as shown in FIG. 7, with planar portions or recesses 22 interposed therebetween.

Figure 6:
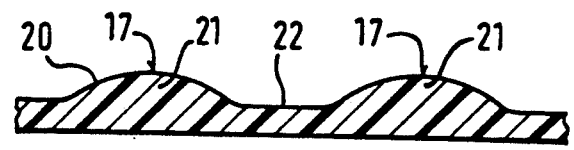
Figure 7:
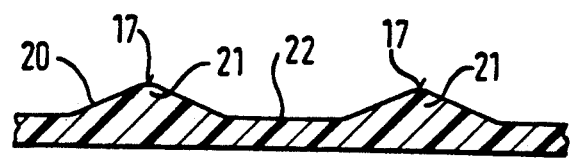

It is also conceivable to provide a curvature or taper of the surface 20 in the radial direction, i.e. in the direction transversely of the drawing plane in FIGS. 5, 6 and 7, in which case the apices 17 will form peaks providing point contact or, under axial pressure, circular contact faces with the radial surface 13. As viewed in FIG. 4, the straight extension of the apex 17 in radial direction would have to be imagined as being replaced by a curvature or as extending with a counter-chamfer from either side (not illustrated).

A shaft seal formed with the protrusions 21 and the surface 20, which may be sinusoidally undulating as shown in FIG. 5, can be produced by injection molding. The mold for producing the undulations may be fabricated in known fashion on a copying lathe.

In a preferred embodiment of the invention, the amplitude a of the sinusoidally undulating surface 20 according to FIG. 5 is less than 3 mm and is preferentially within the range of from 0.5 to 1.00 mm. A corresponding amplitude would also be appropriate in the embodiments illustrated in FIGS. 6 and 7.

For statical reasons, at least three protrusions should be distributed about the circumference of the support portion 8. The period p, i.e. the interval between two adjacent apices 17, of the protrusions in circumferential direction is advantageously in the range between 40 and 60 mm. In an actual construction with a sinusoidal contour, a total of nine protrusions was provided for a diameter of 135 mm of the sinusoidal contour. This corresponds to a period of 47 mm.

Obviously, numerous modifications and variations of the present invention are possible in the light of the above teachings. It is therefore to be understood that within the scope of the appended claims, the invention may be practiced otherwise than as specifically described herein.

What is claimed is:

1. A shaft seal assembly, comprising:
   a first annular casing member;
   a sealing lip mounted on said first casing member;
   a second annular casing member cooperating with said first casing member and disposed in sealing contact with said sealing lip, said second casing member comprising a radial engagement surface;
   an elastomeric support provided on said first casing member for resiliently engaging said engagement surface and for supporting axial loads generated between said first and second casing members, said elastomeric support comprising an annular undulating surface defining a plurality of circumferentially-spaced, axially-extending apices and an inclined surface rising axially toward and meeting each of said apices so as to form a hydrodynamic surface adjacent each of said apices, said undulating surface including a plurality of axially-extending recesses defined between said apices; and
   a lubricant provided between said first and second casing members and flowable into said recesses such that upon relative rotation between said first and second casing members, and elastohydrodynamic film of lubricant is formed between said inclined surfaces and said engagement surface and between said apices and said engagement surface.

2. The shaft seal assembly according to claim 1, in which the elastomeric support is integral with the sealing lip.

3. The shaft seal assembly according to claim 1, in which the undulating surface undulates sinusoidally.

4. The shaft seal assembly according to claim 1, in which the undulating surface has circular arc-shaped undulations.

5. The shaft seal assembly according to claim 1, in which the undulating surface has triangular-shaped undulation.

6. The shaft seal assembly according to claim 1, in which the apices are uniformly spaced apart.

7. The shaft seal assembly according to claim 1, in which the apices are axially spaced less than 3 mm from the recesses.

8. The shaft seal assembly according to claim 7, in which the apices are axially spaced within the range of 0.5 to 1.0 mm from the recesses.

9. The shaft seal assembly according to claim 7, in which the apices are circumferentially spaced apart within the range of from 40 to 60 mm.

10. The shaft seal assembly according to claim 8, in which the apices are circumferentially spaced apart within the range of from 40 to 60 mm.

* * * * *